(12) United States Patent
Rosenzweig et al.

(10) Patent No.: US 9,556,505 B2
(45) Date of Patent: Jan. 31, 2017

(54) THERMAL BARRIER COATING SYSTEMS AND METHODS OF MAKING AND USING THE SAME

(75) Inventors: Larry Steven Rosenzweig, Clifton Park, NY (US); James Anthony Ruud, Delmar, NY (US); Shankar Sivaramakrishnan, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 141 days.

(21) Appl. No.: 13/600,273

(22) Filed: Aug. 31, 2012

(65) Prior Publication Data

US 2014/0065361 A1 Mar. 6, 2014

(51) Int. Cl.
| | |
|---|---|
| *D06N 7/04* | (2006.01) |
| *B32B 9/00* | (2006.01) |
| *B32B 19/00* | (2006.01) |
| *B32B 17/10* | (2006.01) |
| *B32B 3/00* | (2006.01) |
| *C23C 4/00* | (2016.01) |
| *C23C 4/02* | (2006.01) |
| *C23C 4/12* | (2016.01) |
| *C23C 4/18* | (2006.01) |

(52) U.S. Cl.
CPC . *C23C 4/00* (2013.01); *C23C 4/02* (2013.01); *C23C 4/12* (2013.01); *C23C 4/18* (2013.01); *Y10T 428/24355* (2015.01); *Y10T 428/31* (2015.01)

(58) Field of Classification Search
None
See application file for complete search history.

(56) References Cited

U.S. PATENT DOCUMENTS

| | | | | |
|---|---|---|---|---|
| 4,874,664 A | * | 10/1989 | Hamaguchi | C23C 14/226 428/325 |
| 5,305,143 A | * | 4/1994 | Taga | G02B 5/3058 252/585 |
| 5,731,068 A | * | 3/1998 | Mizunoya | G11B 5/66 427/131 |
| 5,932,354 A | * | 8/1999 | Takeda | C03C 17/3417 359/359 |

(Continued)

FOREIGN PATENT DOCUMENTS

| | | | | |
|---|---|---|---|---|
| EP | 0107858 A1 | | 5/1984 | |
| EP | 2145974 | * | 1/2010 | C23C 4/12 |

(Continued)

OTHER PUBLICATIONS

D.D. Hass et al., "Low Thermal Conductivity Vapor Deposited Zirconia Microstructures," Acta Mater. 49 (2001) 973-983.*

(Continued)

*Primary Examiner* — David Sample
*Assistant Examiner* — Nicole T Gugliotta
(74) *Attorney, Agent, or Firm* — Paul J. DiConza

(57) ABSTRACT

A coating comprising a first surface and a second surface is provided. The coating includes a plurality of growth domains. An orientation of at least one growth domain of the plurality of growth domains is non-vertical with respect to the first surface of the coating. One or more growth domains of the plurality of growth domains comprise a plurality of at least partially melted and solidified particles.

16 Claims, 4 Drawing Sheets

(56) References Cited

U.S. PATENT DOCUMENTS

| | | | |
|---|---|---|---|
| 6,129,954 A | 10/2000 | Spitsberg et al. | |
| 6,183,884 B1 | 2/2001 | Rickerby | |
| 6,468,648 B1 | 10/2002 | McCluskey et al. | |
| 6,541,075 B2 | 4/2003 | Hasz et al. | |
| 6,855,416 B2* | 2/2005 | Sugiyama | G11B 5/7325 |
| | | | 428/336 |
| 7,354,663 B2 | 4/2008 | Torigoe et al. | |
| 7,416,788 B2* | 8/2008 | Floyd | C04B 35/486 |
| | | | 416/241 B |
| 2006/0068189 A1 | 3/2006 | Raybould et al. | |
| 2006/0088718 A1* | 4/2006 | Shimizu | C23C 14/0676 |
| | | | 428/469 |
| 2007/0128453 A1* | 6/2007 | Pazidis | G03F 7/70958 |
| | | | 428/446 |
| 2009/0280298 A1 | 11/2009 | Rosenzweig et al. | |
| 2010/0048379 A1 | 2/2010 | Thippareddy et al. | |
| 2010/0143655 A1 | 6/2010 | Rosenzweig et al. | |
| 2011/0086163 A1 | 4/2011 | Ma | |
| 2011/0086177 A1 | 4/2011 | Ma | |
| 2011/0244216 A1 | 10/2011 | Meyer et al. | |
| 2012/0094029 A1* | 4/2012 | Halberstadt et al. | 427/446 |
| 2012/0207973 A1* | 8/2012 | Sakai | G02B 1/118 |
| | | | 428/141 |

FOREIGN PATENT DOCUMENTS

| | | | | |
|---|---|---|---|---|
| EP | 2145974 A1 | 1/2010 | | |
| WO | WO 2008/040678 A1 * | 4/2008 | | B05D 1/02 |
| WO | 2011053368 A1 | 5/2011 | | |

OTHER PUBLICATIONS

Coudert et al, "Suspension Plasma Spraying of Alumina Coatings: Process and Coating Structure," Plasma Science, 2007. ICOPS 2007. IEEE 34th International Conference on, pp. 846, Jun. 2007.

PCT Search Report and Written Opinion dated Feb. 12, 2014, issued in connection with corresponding PCT Application No. PCT/US2013/053183.

Office Action issued in connection with corresponding CN Application No. 201380045087.8 on Jan. 22, 2016.

Ilavsky J., et al., "Influence of Spray Angle on the Pore and Crack Microstructure of Plasma Sprayed Deposits", Journal of the American Ceramic Society, vol. 80 (3), pp. 733-742, 1997.

Rickerby D.S., et al., "X-Ray Diffraction Studies of Physically Vapour-Deposited Coatings", Surface and Coatings Technology, vol. 37, pp. 111-137, 1989.

* cited by examiner

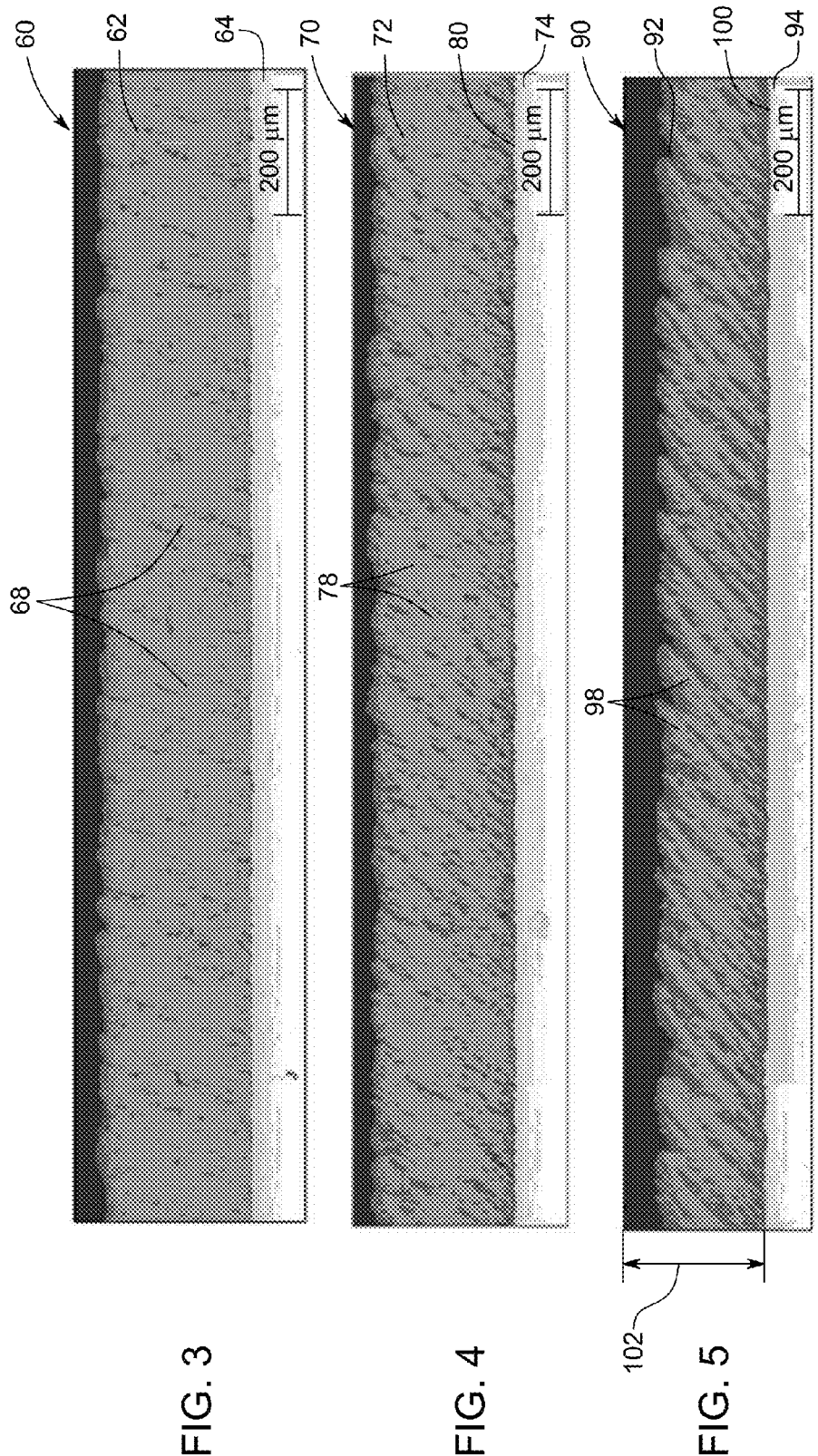

THERMAL BARRIER COATING SYSTEMS AND METHODS OF MAKING AND USING THE SAME

BACKGROUND

The invention relates to thermal barrier coatings and thermal barrier coating systems for high temperature applications, such as gas turbine assemblies.

The design of modern gas turbines is driven by the demand for higher turbine efficiency. It is widely recognized that turbine efficiency may be increased by operating the turbine at higher temperatures. Typically, various techniques are used to apply bondcoats and thermal barrier coatings to airfoils and combustion engine components of the turbine, such as transition pieces and combustion liners, to assure a satisfactory life span at these higher temperatures.

Usually, the thermal barrier coatings are configured to tolerate strain in the underlying component without detaching from the component. The thermal barrier coatings are usually made of ceramic materials, which have relatively lower inherent ductility than their underlying metallic components; hence, various microstructural features are typically incorporated into the thermal barrier coating to provide the thermal barrier coating with improved strain tolerance. For instance, the thermal barrier coatings deposited by plasma spray processes typically incorporate significant porosity, vertical microcracks, or both, as a means to enhance the ability of the thermal barrier coating to tolerate strain. By way of example, thermal barrier coatings deposited by vapor processes, such as physical vapor deposition (PVD), typically are fabricated under conditions that encourage nucleation and growth of discrete, tightly packed, columnar grains, which provides a compliant microstructure with a relatively high degree of strain tolerance.

Although PVD processes provide coatings with suitable strain tolerance on relatively small components as compared with plasma spray processes. However, compared to the plasma spray processes the PVD processes require expensive set-up including a vacuum chamber and supporting equipment. On the other hand, conventional thermal spray processes tend to produce coatings with lower strain tolerance and substrate adhesion than PVD processes, and generally require ancillary surface preparation processes, such as grit blasting and deposition of rough bondcoats, to provide adequate adhesion to the underlying component.

The bondcoats are typically used to promote adhesion of the thermal barrier coating layer to the underlying component and inhibit oxidation of the underlying component during high temperature exposure of the component. Typically, bondcoats having aluminide coatings are used in thermal barrier coating systems to provide oxidation resistance to the substrate and to enhance adhesion of the thermal barrier coatings. In order to have adequate adhesion, plasma sprayed thermal barrier coatings are typically deposited on bondcoats with rough surfaces such as overlay MCrAlY bondcoats. Relatively smoother bondcoats, such as those formed by vapor phase aluminide (VPA), often are not considered suitable candidates for depositing thermal barrier coatings deposited by plasma spray methods.

Therefore, there is a need for thermal barrier coatings that exhibit high strain tolerance, high adhesion, and reduced need for surface preparation processes that can be applied via comparatively inexpensive and scalable processes such as plasma spray processes.

BRIEF DESCRIPTION

In one embodiment, a coating comprising a first surface and a second surface is provided. The coating includes a plurality of growth domains, wherein an orientation of at least one growth domain of the plurality of growth domains is non-vertical with respect to the first surface of the coating. One or more growth domains of the plurality of growth domains comprise a plurality of at least partially melted and solidified particles.

In another embodiment, a thermal barrier coating system may be provided. The system includes a substrate comprising a first surface and a second surface, a bondcoat disposed on at least a portion of the first surface of the substrate, and a coating disposed on at least a portion of the bondcoat, wherein the coating comprises a plurality of growth domains, wherein an orientation of at least one growth domain of the plurality of growth domains is non-vertical with respect to an interface between the bondcoat and the coating. One or more growth domains of the plurality of growth domains comprise a plurality of at least partially melted and solidified particles.

In yet another embodiment, a method for coating a surface is provided. The method includes providing a suspension comprising feedstock material suspended in a liquid medium, and spraying the surface at a spray angle less than about 75 degrees to a tangent of the surface.

DRAWINGS

These and other features, aspects, and advantages of the invention will become better understood when the following detailed description is read with reference to the accompanying drawings in which like characters represent like parts throughout the drawings, wherein:

FIGS. 3-5 are micrographs of portions of thermal barrier coating systems having the thermal barrier coating deposited at three different spray angles, in accordance with embodiments of the present technique;

DETAILED DESCRIPTION

Figure 1:
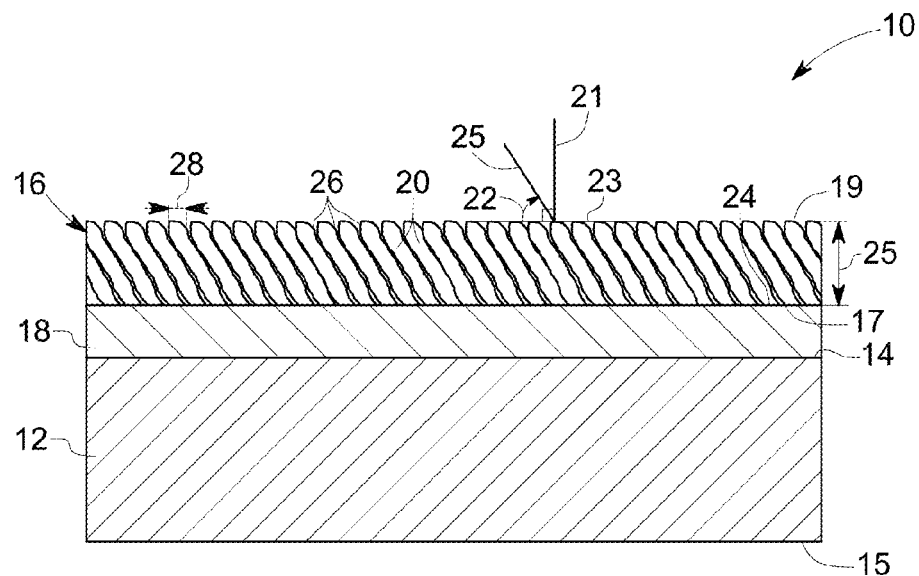
FIG. 1 is a cross-sectional view of an example thermal barrier coating system having a component comprising a planar surface, in accordance with embodiments of the present technique.

Embodiments disclosed herein generally relate to thermal barrier coating systems. In certain embodiments, the thermal barrier coating systems may include a thermal barrier coating disposed on a bondcoat. In these embodiments, the thermal barrier coatings may have a microstructure that is configured to enhance adhesion and strain tolerance. In one embodiment, the values of the enhanced adhesion and strain tolerance of the thermal barrier coatings may approach that of coatings deposited using expensive plasma vapor deposition methods, such as, but not limited to, electron beam plasma vapor deposition methods. In certain embodiments, the thermal barrier coatings may be deposited using comparatively inexpensive suspension or precursor plasma spray techniques, or a combination thereof.

As will be appreciated, in gas turbine applications higher efficiencies of the system may be achieved by using higher operating temperatures. However, as operating temperatures increase, it is desirable to have enhanced high temperature durability of the components of the engine.

Further, to be effective, it is desirable that a thermal barrier coating in a thermal barrier coating system is configured to exhibit low thermal conductivity, strong adherence to the substrate (e.g., an engine component), and continued adherence throughout many heating and cooling cycles. However, differences in the coefficients of thermal expansion between materials of the thermal barrier coating system pose additional challenges. For example, materials of the thermal barrier coating may have a substantially low coefficient of thermal expansion compared to the underlying metallic bondcoat and substrate (e.g., a superalloy substrate), thereby providing the risk of delamination of the thermal barrier coating during the thermal cycles.

In some embodiments, the thermal barrier coatings facilitate high temperature durability of the components of the engine while protecting the components from erosion, hot corrosion, etc. In some of these embodiments, the thermal barrier coatings further serve to reduce heat transfer to the underlying substrate, such as but not limited to, an engine component.

In addition to the thermal barrier coating, the turbine engine components often employ a bondcoat to protect against high temperature oxidation. In certain embodiments, the bondcoats may comprise a diffusion bondcoat. In certain other embodiments, the bondcoats may comprise an overlay bondcoat. In some embodiments, the aluminum concentrations within diffusion bondcoats or overlay bondcoats may be in a range from about 5 to about 50 percent by weight.

In some embodiments, a diffusion bondcoat may include an aluminum based intermetallic compound, such as but not limited to, a nickel aluminide Non-limiting examples of the diffusion bondcoat may include platinum nickel aluminide or simple nickel aluminide applied by vapor or pack diffusion methods. In one embodiment, the aluminide based bondcoat may be disposed on a substrate using a diffusion based process. Non-limiting examples of the diffusion based processes may include pack cementation, vapor phase aluminiding (VPA), or chemical vapor deposition (CVD). In some embodiments, the diffusion process may result in a bondcoat that includes two distinct zones; an outer zone which contains an oxidation resistant phase (such as beta-NiAl), and a diffusion zone which includes the oxidation resistant phase and secondary phases (such as gamma prime, gamma, carbides and sigma). In one example, the aluminide based bondcoat may be deposited using vapor phase aluminizing (VPA). In one embodiment, the diffusion bondcoats may be modified with platinum or platinum group metals. In this embodiment, the phase of aluminide may include $\gamma$-Ni+ $\gamma'$-Ni3Al alloy compositions. In some embodiments, the diffusion aluminide may be applied using commercially available aluminide processes. In some of these embodiments, aluminum may be reacted at the substrate surface to form an aluminum intermetallic compound which provides a reservoir for the formation of an alumina oxidation resistant interlayer. The aluminide bondcoat layer may include aluminum intermetallic phases (e.g. NiAl, CoAl, and (Ni/Co)Al phases) formed by reacting aluminum vapor or aluminum-rich alloy powder with the substrate elements in the outer surface layers of the superalloy component. The bondcoat layer is typically well bonded to the substrate. Aluminizing may be accomplished by techniques, such as but not limited to, pack cementation process, spraying, chemical vapor deposition, electrophoresis, sputtering, and slurry sintering with an aluminum rich vapor and appropriate diffusion heat treatments.

In some embodiments, overlay bondcoats may be used to provide high temperature oxidation and corrosion protection to the underlying substrate, such as the turbine components. The overlay bondcoats may include MCrAlY type, where M may represent nickel, cobalt, iron, or combinations thereof. Additions of various quantities of other elements such as titanium, zirconium, hafnium, silicon, tantalum, tungsten, niobium, rhenium, or combinations thereof, may be used to enhance the performance of the bondcoat. Advantageously, the overlay bondcoats may not be significantly influenced by the composition of the underlying substrate. In one example, the overlay bondcoats may be applied by a number of different deposition methods such as, but not limited to, thermal spray, sputtering, electron beam physical vapor deposition (EBPVD), cathodic arc deposition, electro-deposition, or combinations thereof.

Typically, air plasma sprayed bondcoats are often deposited with intentionally rough surfaces to enhance mechanical interlocking with subsequently deposited thermal barrier coating. In stark contrast to these conventional coating systems, the thermal barrier coatings disclosed herein may exhibit relatively high adhesion strength, even to comparatively smooth surfaces, such as a surface of a VPA bondcoat.

In some embodiments, the bondcoats are relatively smooth, with a surface roughness of between about 10-60 micro-inches Ra. Typically, such smooth bondcoats are not suitable candidates for less expensive coating techniques, such as spray based coating techniques. Vertical cracks produced within the thermal barrier coating layer are not desirable in such coatings as they reduce the adhesion strength of the coatings. In certain embodiments, coatings disclosed herein may be disposed on the bondcoats using spray methods. It has been unexpectedly discovered that the coatings disclosed herein exhibit enhanced adhesion and thermal cycle performance when deposited on the aluminide based bondcoats or the overlay bondcoats.

Typically, thermal barrier coatings having vertical cracks are desirable on bondcoats with smooth surfaces, such as aluminide based bondcoats, as they would allow the coatings to be more compliant. For example, the vertical cracks may allow the coating to flex without delaminating. However, it has been demonstrated that coatings without cracks have better adhesion to the aluminide based bondcoats and overlay bondcoats. Similarly, coatings without cracks also have longer thermal cycling lives in case of the aluminide based bondcoats and overlay bondcoats. For example, coatings with vertical cracks applied to relatively smooth aluminide based bondcoats, such as but not limited to VPA bondcoat, exhibit delamination at the interface between the thermal barrier coating and the bondcoat. Advantageously, in the absence of such vertical cracks, interfacial delamination may not be present when the microstructure of the thermal barrier coating does not contain vertical cracks. In certain embodiments, the thermal barrier coating may have non-vertical growth domains, and the delamination may be minimal or absent in these thermal barrier coatings.

Advantageously, the substantially vertical crack free and compliant microstructures in the thermal barrier coating facilitate enhanced adhesion between the thermal barrier coating and the underlying bondcoat. Further, the thermal cycling performance of the thermal barrier coating system may be substantially improved over more dense and vertically cracked thermal barrier coatings.

In some embodiments, the bondcoat may have a surface roughness of less than about 150 micro-inches Ra. In one embodiment, the surface roughness of the bondcoat may be less than or equal to about 100 micro-inches Ra. Even at such reduced bondcoat roughness values, the adhesion strength of the thermal barrier coating described herein is unexpectedly high. In some embodiments, this adhesion strength of the thermal barrier coating to the aluminide based bondcoat may be greater than about 7 megapascals (MPa). In one example, the adhesion strength of the thermal barrier coating to the aluminide based bondcoat may be greater than about 28 MPa. Adhesion strengths as referred to herein refer to values measured in accordance with the procedure set forth in ASTM Standard C633.

In certain embodiments, the thermal barrier coatings may be configured to tolerate strain in the underlying component without being detached from the component. The thermal barrier coatings may be made of ceramic materials, which may have relatively lower inherent ductility than the underlying metallic components; hence, in certain embodiments, various microstructural features may be incorporated into the thermal barrier coating to provide the thermal barrier coating with improved strain tolerance and adherence. As described in detail below with regard to FIGS. 1-5, in some embodiments, the thermal barrier coatings may comprise a plurality of growth domains in the thermal barrier coating. In certain embodiments, as the material is deposited to form the thermal barrier coating, the material accumulates in domains defined as regions of comparatively high density separated by domain boundaries of comparatively low (though not necessarily zero) density. In accordance with embodiments of the present invention, one or more domains may comprise a plurality of at least partially melted and solidified particles. Without being bound by any particular theory, it is believed that domain boundaries are formed between the growth domains as the particles accumulate within the growth domains and that the growth domains may have boundary surfaces comprising partially melted and solidified particles. Domain boundaries are to be contrasted with vertical cracks. Vertical cracks are separations that occur in a coating when a crack grows through previously integral and continuous material. Crack surfaces comprise the faces of grain boundaries or grain interiors that have been exposed through crack growth. The orientation of at least one growth domain of the plurality of growth domains may be non-vertical with respect to a first surface of the coating, where the first surface of the coatings is disposed on the bondcoat.

FIG. 1 illustrates an example thermal barrier coating system 10. The system 10 comprises a component 12 having a first surface 14 and a second surface 15. A bondcoat 18 may be disposed on the first surface 14 of the component 12. The bondcoat 18 is disposed on at least a portion of the first surface 14. The system 10 further comprises a thermal barrier coating 16 having a first surface 17 and a second surface 19. The first surface 17 of the thermal barrier coating 16 is disposed on the bondcoat 18 and defines an interface 24 with the bondcoat 18.

The first surface 14 of the component 12 may be curved or planar, or combinations thereof. The thermal barrier coating 16 and the bondcoat 18 may be conformally disposed on the first surface 14 of the component 12.

The thermal barrier coating system 10 may be used in elevated temperature applications. In one example, the thermal barrier coating system 10 may be employed in a gas turbine assembly, including, for instance, a gas turbine assembly for power generation or for propulsion of a ship, aircraft, or other craft. Non-limiting examples of the component 12 may include turbine blades, stator vanes, and combustion components. In some embodiments, the thermal barrier coating 16 comprises a ceramic material, such as an oxide. Particular examples of the thermal barrier coating 16 may include stabilized zirconia, such as yttria-stabilized zirconia; zirconates; and other oxides, such as hafnates and cerates, and including oxides that may be stabilized with yttria or other stabilizing agents, such as ceria.

In certain embodiments, the thermal barrier coating 16 may be generally characterized by a plurality of growth domains, generally represented by reference numeral 20. One or more growth domains of the plurality of growth domains comprise a plurality of at least partially melted and solidified particles. In some embodiments, an orientation of at least one growth domain may be non-vertical with respect to the first surface 17, or an interface 24 between the first surface 17 and the bondcoat 18. As used herein, the term "non-vertical" refers to an alignment angle 22 formed within the cross-sectional plane, where the angle 22 is defined as an angle that is 90 degrees minus the angular displacement between (a) a normal 21 to a tangent 23 of the first surface 17 of the coating 16, and (b) a tangent 25 to the domain boundary 26. In one embodiment, the angle 22 may be in a range from about 30 degrees to about 75 degrees to the interface 24 between the thermal barrier coating 16 and the bondcoat 18. That is, a longest axis of a growth domain may be oriented at an angle 22 in a range from about 20 degrees to about 75 degrees to the first surface 17 of the coating 16. In one embodiment, all the growth domains 20 may be oriented at similar angles with respect to each other. In this embodiment, the angles of the growth domains 20 may be within 5 degrees of each other. In one embodiment, the growth domains 20 may comprise an aspect ratio of greater than about 1.

In some embodiments, the growth domains 20 may contain randomly oriented, substantially equiaxed grains. As used herein, the term "substantially equiaxed" means the population of grains in the coating 16 has a median aspect ratio of less than about 3:1. Moreover, "randomly oriented" refers to the general lack of a preferred orientation such that long axes of grains (if such a long axis is present) are not as a whole oriented with respect to a spray direction or solidification direction. Further, in some embodiments, the thermal barrier coating 16 may be generally characterized by the absence of distinct lamellar features. Note that this use of the term "orientation" referring to the placement of a grain in space should not be confused with crystallographic orientation, also called in the art "texture," of a material.

In certain embodiments, during deposition of the coating 16, as the material is deposited to form the coating 16, the material accumulates in the domains 20. In some embodiments, the domains 20 may have comparatively high density of the coating material. The growth domains 20 may be defined by domain boundaries 26. The growth boundaries 26 may have comparatively low (though not necessarily zero) density than the growth domains 20.

The density of material contained within the growth domains 20, also referred to herein as "intra-domain density," may be at least about 75% of the theoretical density. In some embodiments, this density is even higher, such as greater than 85% and, in certain embodiments, greater than 95%. A high intra-domain density may provide desirable resistance to erosion and may enhance cohesive strength of the coating 16.

In certain embodiments, at least 50% of the material present in domains 20 comprises at least partially melted and solidified particles; in particular embodiments this amount may be at least about 80%, and in more particular embodiments substantially all of the material in the domains 20 may be made of at least partially melted and solidified particles. Moreover, in some embodiments, domains 20 may generally lack substantial crystallographic texture, in stark contrast to coatings deposited via a vapor deposition mechanism. Instead, domains 20 typically have a substantially isotropic crystallographic orientation. In this context, a "substantially isotropic crystallographic orientation" means that the material in question has a texture coefficient in the range from about 0.75 to about 1.25, as that coefficient is defined in D. S. Rickerby, A. M. Jones and B. A. Bellamy, Surface and Coatings Technology, 37, 111-137 (1989).

In one embodiment, one or more growth domains may extend through a thickness 25 of the thermal barrier coating 16. In these embodiments, the growth domains 20 may extend from the first surface 17 to the second surface 19 of the thermal barrier coating 16. In another embodiment, one or more growth domains may extend through only a portion of the thickness 25 of the thermal barrier coating 16. In some embodiments, the growth domains extend at least about 50% of the coating thickness, and in certain embodiments the growth domains length is at least about 75% of the coating thickness. As used herein, the "length" of the growth domains in this context may be defined as the median length measured for at least a representative sample of the population of the growth domains 20 in the coating 16. The extent to which a growth domain may extend through the thickness 25 of the thermal barrier coating 16 may depend on factors such as but not limited to, orientation of the growth domains, material of the coating, spray angle during deposition of the coating 16, or combinations thereof. In one embodiment, it may be desirable to have one or more growth domains that extend through the thickness of the thermal barrier coating 16. The domain boundaries 26 may, in some embodiments, extend for a length equal to at least about 50% of the coating thickness, and this length may be at least about 75% of the thickness in certain embodiments. Generally, the strain tolerance of the coating 16 may be enhanced by the presence of longer, well-defined boundaries 26.

The presence of the growth domains 20 and the domain boundaries 26 may provide desirable compliance and strain tolerance properties for the coating 16. In one embodiment, the coating 16 with narrower domains 20 has a greater density of domain boundaries. In some embodiments, a median width 28 of the domain 20 may be in the range from about 20 micrometers to about 100 micrometers. In some other embodiments, the width 28 may be in a range from about 30 micrometers to about 90 micrometers. In one embodiment, the width 28 may be in a range from about 40 micrometers to about 80 micrometers. In certain embodiments, the width 28 of the growth domains 20 may be measured based on the average number of boundaries respectively intercepted by lines of known length drawn along a cross section of the coating 16 in a direction parallel to the spray direction at 33% of the coating thickness 25 and at 67% of the coating thickness 25. In these embodiments, the mean domain width may be calculated as a length divided by the number of intercepted boundaries. In certain embodiments, at least about 50% by volume of the coating contains domains 20; thus it is not necessary that the entire coating 16 comprise the structure described herein.

The advantages described herein may enhance the suitability of thermal barrier coating system 10 for use in elevated temperature applications. In some embodiments, unlike conventional dense coatings deposited on smooth surfaces, the coatings 16 may have minimal or no segmentation cracks within the TBC, a condition referred to herein as "substantially crack-free." Segmentation cracks, also known in the industry as vertical cracks, are typically more prevalent within dense coatings. These types of cracks may extend from the outermost surface through the entire thickness or partially through the coating thickness. Such cracks are distinguishable from domain boundaries in that the space within a crack is bound by a fracture surface, and is essentially void of coating particles along its length. In contrast, the space within a domain boundary contains at least some deposited material, such as coating particles, along its length. In certain embodiments, the substantially crack free and compliant coatings 16 may provide significantly improved adhesion to the bondcoat 18. Further, the substantially crack free and compliant coatings 16 may provide coatings with significantly enhanced thermal cycle performance, including improved reliability, adherence, and longer life. In certain embodiments, the coatings 16 may not comprise any delamination cracks.

Typically, in plasma spray deposition, for surfaces with curvatures, it is difficult to continuously maintain a desirable spray angle for the surface to be coated. For example, it may be difficult for a robotic arm to keep up with a change in a curvature of the surface. Conventional coatings may exhibit lower adhesion and mechanical strength when the incident angle of the plasma is not perpendicular to the surface to be coated. In certain embodiments, methods and coatings are provided that exhibit enhanced adhesion at spray angles in a determined range. Further, the methods are cost effective relative to the existing PVD techniques.

Figure 2:
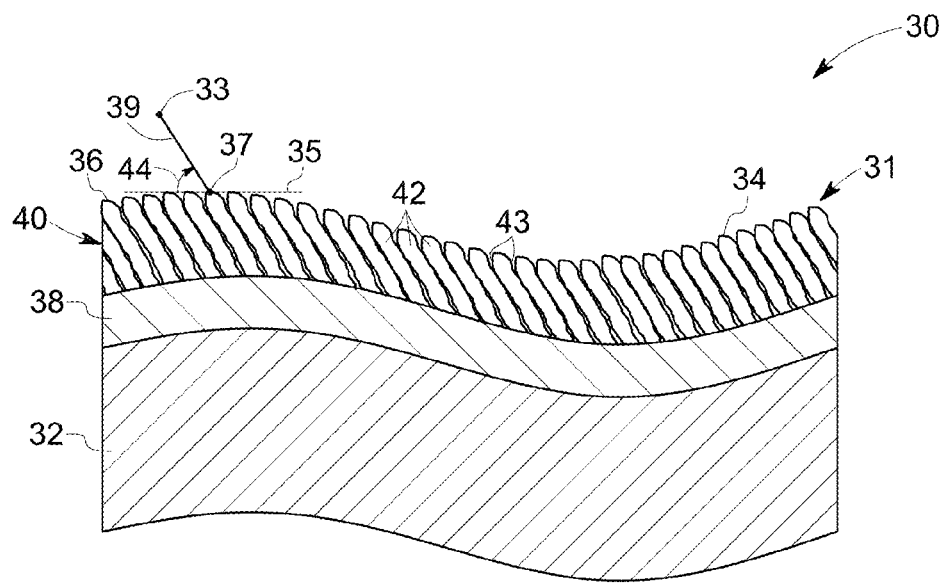
FIG. 2 is a cross-sectional view of an example thermal barrier coating system having a component comprising a non-planar surface, in accordance with embodiments of the present technique.

FIG. 2 is a cross-sectional view of a thermal barrier coating system 30 having a non-planar surface 31. In the illustrated embodiment, the system 30 comprises a non-planar substrate 32 having concave and convex portions 34 and 36, respectively, viewing perpendicular to a direction of a spray gun, generally referred to by arrow 33. The system 30 further comprises a bondcoat 38 and a thermal barrier coating 40. The bondcoat 38 and the coating 40 may be conformal to the underlying surface. The coating 40 may comprise a plurality of growth domains 42 having domain boundaries 43.

In one example, the portions 34 and 36 may be such that the spray angle 44 may be in a range from about 20 degrees to about 75 degrees. As used herein, the term "spray angle," is an angle measured in a clockwise direction at a point of incidence 37, the angle is measured between a plane tangent to the surface 31 at the point of incidence 37 and a line 39 connecting the angle of incidence and the position of the spray gun, where the position of the spray gun is represented by a point 33, and the plane tangent to the surface 31 is represented by a line 35.

FIGS. 3-5 illustrate thermal barrier coatings deposited at different spray angles relative to the surface on which the coating is deposited. In certain embodiments, different spray angles may provide a plurality of growth domains that are oriented at different non-vertical angles with respect to the interface between the first surface of the coating and the bondcoat.

FIG. 3 illustrates a thermal barrier coating system 60 having a coating 62 disposed on a bondcoat 64, where the bondcoat in turn is disposed on a substrate (not shown). The coating 62 includes a plurality of non-vertical growth domains 68, which are oriented at an angle of about 70 degrees with respect to an interface 80 between the coating 62 and the bondcoat 64. In the illustrated embodiment, the growth domains 68 are substantially parallel to each other.

The growth domains 68 may extend through the entire thickness of the coating 62. Alternatively, the growth domains 68 may be disposed in only a portion of the thickness of the coating 62.

FIG. 4 illustrates a thermal barrier coating system 70 having a coating 72 deposited on a bondcoat 74 disposed on a substrate (not shown). The coating 72 includes a plurality of non-vertical growth domains 78, which are oriented at an angle of about 60 degrees with respect to an interface 80 between the coating 72 and the bondcoat 74. The growth domains 78 are substantially parallel to each other. The growth domains 78 run through a portion of the thickness of the coating 72.

FIG. 5 illustrates a thermal barrier coating system 90 having a coating 92 deposited on a bondcoat 94 disposed on a substrate (not shown). The coating 92 includes a plurality of non-vertical growth domains 98, which are oriented at an angle of about 45 degrees with respect to an interface 100 between the coating 92 and the bondcoat 94. The growth domains 98 are substantially parallel to each other. As illustrated, the growth domains 98 run through the entire thickness 102 of the coating 92.

In the illustrated embodiments of FIGS. 3-5, the angle of spray gun and orientation of the growth domains may be same or different. For example, referring back to FIG. 3, the gun angle may be about 75 degrees to the surface of the substrate, and the orientation of the growth domains 68 may be about 70 degrees. Similarly, referring back to FIG. 4, the gun angle is about 60 degrees, and the orientation of the growth domains 78 is about 52 degrees. Referring back to FIG. 5, the gun angle is about 45 degrees, and the orientation of the growth domains 98 is about 40 degrees.

In certain embodiments, the thermal barrier coatings may be comparatively more reliable, adherent, compliant, and may have longer life relative to conventional coatings.

As a cost effective alternative to electron beam plasma vapor deposition (EBPVD) application of thermal barrier coatings to turbine engine components, a suspension plasma spray method may be used to deposit the thermal barrier coating system disclosed herein. The suspension plasma spray method utilizes fine particles of the intended coating material, or precursor thereof, dispersed into suspension in a liquid medium and passed through a plasma spray torch to deposit the material on the surface of the component. In certain embodiments, the thermal barrier coatings may be applied on a surface of a diffusion bondcoat or an overlay bondcoat.

Coatings of the present invention owe their remarkable structures and properties at least in part to the processing used in their fabrication. The process involves air plasma spraying, which, as discussed above, provides certain economic and manufacturing advantages over processes that require the use of vacuum equipment, such as PVD or vacuum plasma spray deposition. In certain embodiments, the process uses a feedstock comprising fine particles suspended in a liquid agent that is fed to a plasma spray torch in a controlled manner and injected into the plasma plume for deposition onto a substrate. The particles have a median diameter typically, but not necessarily, in the range from about 0.1 micrometers to about 10 micrometers, or 0.2 micrometers to 10 micrometers.

Figure 6:
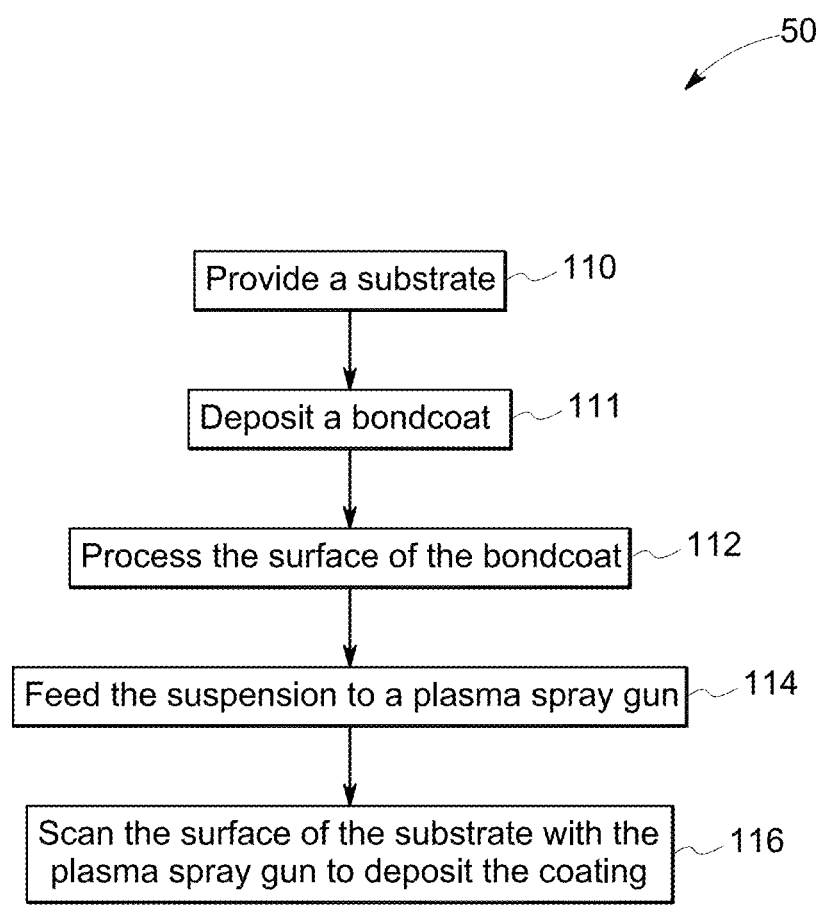
FIG. 6 is a flow chart for a method of making a thermal barrier coating system, in accordance with embodiments of the present technique.

FIG. 6 is an example flow chart of a method for depositing the coatings on an aluminide based bondcoat. At block 110, a substrate may be provided. The substrate may be an engine component. The substrate may be a metallic substrate, which may have planar or non-planar surfaces. In one embodiment, the substrate may comprise a diffusion bondcoat on one or more surfaces. In another embodiment, the substrate may comprise an overlay bondcoat on the one or more surfaces. In one example, the diffusion bondcoat may be deposited on the surface of the substrate by employing vapor phase aluminizing.

Optionally, at block 111, a bondcoat may be deposited using known techniques, such as but not limited to, vapor phase deposition. In one example, the aluminide based bondcoat may be disposed on at least a portion of the substrate.

Optionally, at block 112, the surface of the bondcoat may be processed to facilitate adhesion of the thermal barrier coating to the bondcoat. Non-limiting examples of the processing include roughening prior to depositing the coating. In one example, the surface of the bondcoat may be grit blasted prior to depositing the coating.

At block 114, a feedstock comprising fine particles of material or precursor material of the thermal barrier coating may be suspended in a liquid medium. In one embodiment, the particles may have a median diameter in the range from about 0.4 micrometers to about 2 micrometers. In one example, solids content of powders in suspensions may be in a range from about 5 weight percent to about 40 weight percent.

At block 114, the suspension may be fed to a plasma spray gun in a controlled manner and injected into the plasma plume for deposition onto a substrate.

At block 116, the spray gun may scan the surface of the substrate to deposit the coating. The surface of the substrate may be scanned in a regular or irregular pattern. In one example, the plasma spray torch may raster the surface of the substrate.

The plasma spray torch or gun, the substrate, or both may be oriented relative to each other such that the plasma spray is incident on the first surface of the substrate at an angle in a range from about 20 degrees to about 75 degrees. In one embodiment, the angle at which the plasma is incident on the substrate may be varied during the deposition. In another example, the angle at which the plasma is incident on the substrate may not be varied during the deposition.

In one example, where the surface of the substrate has a changing curve, it may not be easy to continuously adjust the spray angle as the surface is being scanned. In this example, the angle at which the plasma is incident on the substrate may vary during the deposition as the spray gun moves from one position on the substrate to another.

EXAMPLE 1

Yttria-stabilized-zirconia (YSZ) coatings were produced on 25 mm diameter, 3 mm thick button substrates of Rene N5 with vapor phase diffusion nickel aluminide bondcoat. The YSZ coatings were deposited on the bondcoat surface using a Northwest Mettech Axial III DC plasma torch. Prior to YSZ deposition, the surface of the VPA bondcoat was roughened by abrasive blasting using a 220 mesh white aluminum oxide media at 60 psi air pressure.

The feedstock material was YSZ powder ($ZrO_2$- (7-8) weight % $Y_2O_3$) with a median particle diameter ($d_{50}$) of about 0.75 μm suspended in ethanol at 20 wt % using polyethyleneimine as a dispersant (at 0.2 wt % of the solids). Two different suspensions were made using different YSZ powders, obtained from UCM Ceramics in Laufenburg, Germany. The two different suspensions were mixed together to obtain the final particle size distribution. Each powder had a unimodal particle size distribution with a different mean size. The $d_{50}$ of one of the powders as provided by the manufacturer was approximately 0.6 microns, and the $d_{50}$ of other powder was approximately 1.0 micron.

The suspension was injected into a Northwest Mettech Axial III torch through the center tube of a tube-in-tube atomizing injector with a nitrogen atomizing gas sent through the outer tube. A ⅜" diameter nozzle was used at the end of the plasma torch. The torch power was about 105 kW. The suspension feed-rate was about 25 grams/minute or about 0.6 pounds per hour of YSZ. The plasma torch was rastered across the substrate at 600 mm/sec while maintaining a constant spray distance of 100 mm distance between the torch nozzle and substrate. Coatings were produced at different spray angles of the plasma torch relative to the sample surfaces. Angles of 90 degrees, 75 degrees, 60 degrees, and 45 degrees were utilized to evaluate adhesion and thermal cycling performance. Coating thicknesses of about 150 to about 220 microns were obtained. Plasma conditions used for the YSZ deposition were 350 slpm total gas flow with 15% nitrogen, 10% hydrogen, and 75% argon. A current of 200 A was used for each of the three electrodes, resulting in a total gun power of approximately 105 kW. Nitrogen carrier gas of 6 slpm was also used.

In certain embodiments, unexpectedly, the number of thermal cycles to cause 20% spallation showed a general increase as the coating angle was reduced from 90 degrees to 45 degrees. The average number of thermal cycles to cause 20% spallation for a coating deposited at a spray angle of 45 degrees was 60% greater than that of a coating deposited at a spray angle of 90 degrees.

EXAMPLE 2

Coatings illustrated in FIGS. 7-10 were produced the same way as described above, except the feedstock for these samples was a suspension consisting of the YSZ powder with a d50 of about 1 micron.

Figure 7:
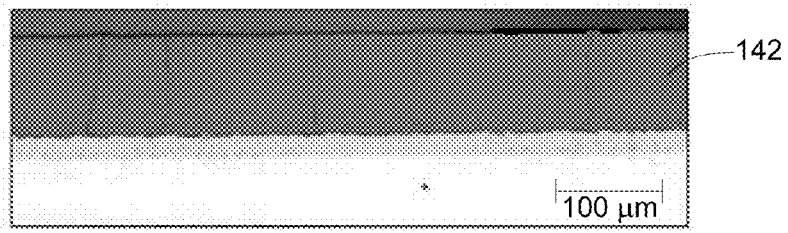
FIGS. 7-10 are micrographs of coatings produced using a feedstock having a suspension consisting of YSZ powder with a d50 of about 1 micron.
Figure 8:
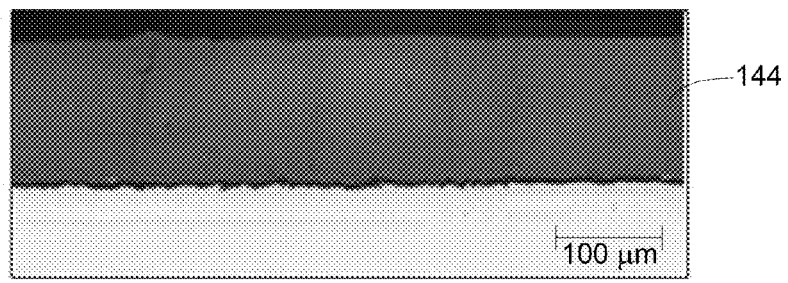
Figure 9:
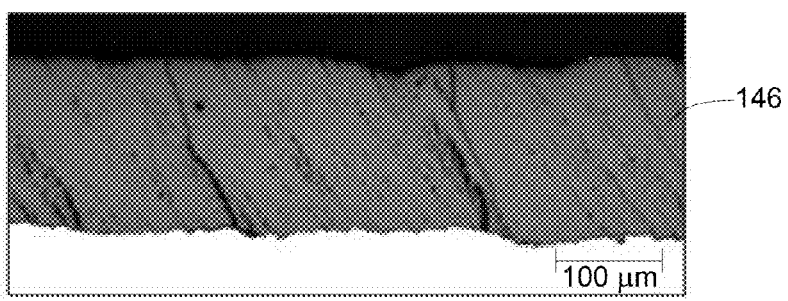
Figure 10:
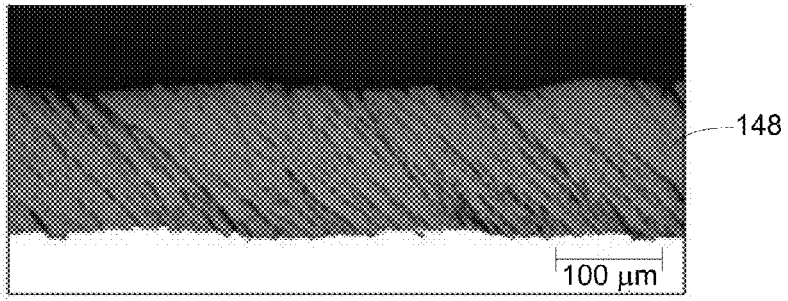

FIG. 7 illustrates a coating 142 deposited at a spray angle of 90 degrees, FIG. 8 illustrates a coating 144 deposited at a spray angle of 75 degrees, FIG. 9 illustrates a coating 146 deposited at a spray angle of 60 degrees, and FIG. 10 illustrates a coating 148 deposited at a spray angle of 45 degrees. With coarser particles in the feedstock, it was found that the spray angles that produced adherent and compliant coatings were less than coatings produced from finer particle containing feedstocks, suggesting an unexpected interaction between particle size and spray angle.

While only certain features of the invention have been illustrated and described herein, many modifications and changes will occur to those skilled in the art. It is, therefore, to be understood that the appended claims are intended to cover all such modifications and changes as fall within the scope of the invention.

The invention claimed is:

1. A coating comprising a first surface and a second surface, comprising:
a plurality of growth domains separated by domain boundaries, wherein the plurality of growth domains comprises a comparatively high density of a coating material and the domain boundaries comprise a comparatively low density of the coating material, wherein the plurality of growth domains comprises a substantially equiaxed grain morphology, wherein growth domains of the plurality of growth domains are substantially parallel to one another, wherein an orientation of one or more growth domains of the plurality of growth domains is non-vertical with respect to the first surface of the coating, wherein the one or more non-vertical growth domains form an alignment angle in a range from about 30 degrees to about 75 degrees with respect to the first surface of the coating, wherein at least about 50 percent by volume of the coating comprises the plurality of growth domains, wherein angles of the plurality of growth domains are within 5 degrees of each other, wherein the coating is substantially crack-free with regard to vertical cracks, and wherein the vertical cracks extend from an outermost surface of the coating through entire thickness or partial thickness of the coating.

2. The coating of claim 1, wherein the orientation of the one or more growth domains is less than about 75 degrees with respect to the first surface of the coating.

3. The coating of claim 1, wherein the plurality of growth domains comprises a width in a range from about 20 microns to about 100 microns.

4. The coating of claim 1, wherein the plurality of growth domains comprise an intra-domain density of at least about 90 percent.

5. The coating of claim 1, wherein the plurality of growth domains of the coating comprises a ceramic material.

6. The coating of claim 1, wherein the plurality of growth domains of the coating comprises an oxide.

7. The coating of claim 1, wherein the plurality of growth domains of the coating is deposited using spraying.

8. The coating of claim 1, wherein the plurality of growth domains of the coating comprises stabilized zirconia, zirconates, stabilized oxides, or combinations thereof.

9. The coating of claim 1, wherein the plurality of growth domains of the coating comprises yttria stabilized zirconia.

10. The coating of claim 1, wherein the coating is a thermal barrier coating.

11. A thermal barrier coating system, comprising:
a substrate comprising a first surface and a second surface;
a bondcoat disposed on at least a portion of the first surface of the substrate; and
a coating disposed on at least a portion of the bondcoat, wherein the coating comprises a plurality of growth domains, wherein growth domains of the plurality of growth domains are substantially parallel to one another, wherein the growth domains are separated by domain boundaries, wherein an orientation of one or more growth domains of the plurality of growth domains is non-vertical with respect to an interface between the bondcoat and the coating, wherein the one or more non-vertical growth domains form an alignment angle in a range from about 30 degrees to about 75 degrees with respect to the interface between the bondcoat and the coating, wherein at least about 50 percent by volume of the coating comprises the plurality of growth domains, wherein the plurality of growth domains comprises regions of comparatively high density of a coating material and domain boundaries are regions of comparatively low density of the coating material, wherein the coating is substantially crack-free with regard to vertical cracks, wherein the vertical cracks extend from an outermost surface of the coating through entire thickness or partial thickness of the coating, and wherein interfacial delamination is absent or minimal at the interface between the bondcoat and the coating.

12. The thermal barrier coating system of claim 11, wherein the bondcoat comprises a diffusion bondcoat or an overlay bondcoat.

13. The thermal barrier coating system of claim 11, wherein the bondcoat has a surface roughness of less than about 150 microinches.

14. The thermal barrier coating system of claim 11, wherein an adhesion strength of the coating to the bondcoat is greater than about 7 megapascals.

15. The thermal barrier coating system of claim 11, wherein an adhesion strength of the coating to the bondcoat is greater than about 28 megapascals.

16. The thermal barrier coating system of claim 11, wherein the substrate comprises a component of a gas turbine assembly.

* * * * *